(12) United States Patent
Qian et al.

(10) Patent No.: US 11,768,180 B1
(45) Date of Patent: Sep. 26, 2023

(54) METHOD FOR ULTRASONIC GUIDED WAVE QUANTITATIVE IMAGING IN FORM OF VARIABLE ARRAY

(71) Applicant: Nanjing University of Aeronautics and Astronautics, Nanjing (CN)

(72) Inventors: Zhenghua Qian, Nanjing (CN); Zhi Qian, Nanjing (CN); Peng Li, Nanjing (CN); Xianwei Wu, Nanjing (CN); Chen Yang, Nanjing (CN); Yinghong Zhang, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 18/176,439

(22) Filed: Feb. 28, 2023

(30) Foreign Application Priority Data

Jun. 16, 2022 (CN) .......................... 202210701315.3

(51) Int. Cl.
| | | |
|---|---|---|
| *G01N 29/06* | (2006.01) | |
| *G06T 7/00* | (2017.01) | |
| *G01N 29/04* | (2006.01) | |
| *G06T 7/40* | (2017.01) | |

(52) U.S. Cl.
CPC ......... *G01N 29/069* (2013.01); *G01N 29/041* (2013.01); *G06T 7/0004* (2013.01); *G01N 2291/015* (2013.01); *G01N 2291/0234* (2013.01); *G01N 2291/106* (2013.01); *G06T 7/40* (2013.01); *G06T 2207/30108* (2013.01)

(58) Field of Classification Search
CPC ............... G01N 29/069; G01N 29/041; G01N 2291/015; G01N 2291/0234; G01N 2291/106; G06T 7/0004; G06T 7/40; G06T 2207/30108
See application file for complete search history.

(56) References Cited

U.S. PATENT DOCUMENTS

| | | | |
|---|---|---|---|
| 2009/0049916 A1* | 2/2009 | Sargent ................ | G01N 29/041 73/588 |
| 2014/0216158 A1* | 8/2014 | Sanabria Martin .... | G01N 29/06 73/588 |
| 2019/0072526 A1* | 3/2019 | Kitazawa ............. | G01N 29/262 |

\* cited by examiner

*Primary Examiner* — Sheela C Chawan
(74) *Attorney, Agent, or Firm* — Getech Law LLC; Jun Ye

(57) ABSTRACT

The present disclosure relates to a method for ultrasonic guided wave quantitative imaging in a form of variable array and belongs to the technical field of ultrasonic non-destructive testing. The method includes: converting a non-linear lippmann-Schwinger equation into a form of linear summation by a method of moments; and selecting acquisition arrays with different numbers of probes to measure a scattered field signal, and modifying Green's functions by variable born approximation for continuous iterations to approximate a true solution, so as to obtain a final objective function $O_k$ to be solved. According to the present disclosure, by adjusting the arrays, the number of probes and appropriate solution algorithm can be selected based on the testing accuracy; and the method can achieve quantitative evaluation of non-destructive testing, and can be widely used in practical guided wave testing applications of industrial non-destructive testing.

7 Claims, 5 Drawing Sheets

METHOD FOR ULTRASONIC GUIDED WAVE QUANTITATIVE IMAGING IN FORM OF VARIABLE ARRAY

TECHNICAL FIELD

The present disclosure relates to the technical field of ultrasonic non-destructive testing, in particular to a method for ultrasonic guided wave quantitative imaging in a form of variable array.

BACKGROUND

Lamb wave features long propagation distance and dispersion in a metal plate structure, and is quite sensitive to the change of plate thickness. Lamb wave has been applied in many fields such as liquid storage tank detection, oil and gas pipeline detection, and aircraft skin detection in the chemical industry. Therefore, ultrasonic guided wave non-destructive testing technology based on lamb wave has become a research hotspot in the field of non-destructive testing.

In order to meet the requirements for ultrasonic guided wave quantitative inspection, many important achievements have been made in many research fields related to guided wave in recent years, such as the design of ultrasonic transducers, guided wave modal separation, and dispersion compensation technology. Since 1985, ultrasonic guided wave technology has been rapidly applied in the fields of non-destructive testing and structural health monitoring, and new ultrasonic computational tomography techniques have been developed in the industrial field and used to qualitatively characterize defects. In recent years, many researchers have been trying to improve the imaging accuracy and realize the quantitative description of defects. Although they have made a lot of systematic research achievements, most of them stay in the level of numerical calculation or simulation, and there are still some defects in practical operation and feasibility.

SUMMARY

The objectives of the present disclosure are to overcome the defects in the prior art and provide a method for ultrasonic guided wave quantitative imaging in a form of variable array. By means of the method, in the case of sparse or dense acquisition arrays, imaging of the thickness of a tested region may be performed with scattered field experimental signals acquired by an ultrasonic transducer, so as to achieve quantitative evaluation.

The objectives of the present disclosure are implemented through the following technical solutions: a method for ultrasonic guided wave quantitative imaging in a form of variable array includes:

converting a non-linear integral result of a lippmann-Schwinger equation into a form of linear summation $$U^{(t)} = U^{(in)} + COU^{(t)}$$

$$U^{(s)} = DOU^{(t)}$$

by a method of moments, $U^{(t)}$ denoting a total field, $U^{(in)}$ denoting an incident field, $U^{(s)}$ denoting a scattered field, C denoting a Green's function of a zero-defect aluminum plate, O denoting an objective function to be solved, D denoting a Green's function of a defective aluminum plate;

selecting, based on data of a measured scattered field, acquisition arrays with different numbers of probes as an initial input, selecting different solution algorithms for the acquisition arrays with different numbers of probes, and modifying the Green's functions by variable born approximation for continuous iterations to approximate a true solution, so as to obtain a final objective function $O_k$ to be solved; and converting, through a dispersion curve, the final objective function $O_k$ to be solved into a form of thickness d, where $d=f(O_k)$, and performing imaging based on a thickness of each point on a plate, pixels of each point representing the thickness of the point on the plate.

The selecting, based on data of a measured scattered field, acquisition arrays with different numbers of probes as an initial input, and selecting different solution algorithms for the acquisition arrays with different numbers of probes includes:

A1, dividing a region to be tested into N grids, and arranging m sensor probes on a circumferential boundary;

A2, capturing actual scattered field signals with any one of the sensor probes as excitation and all residual sensor probes as receiving points, so as to obtain a group of scattered field signals;

A3, selecting different sensor probes as excitation, repeating step A2 to obtain m(m−1) groups of scattered field signals, and converting, through the scattered field, the objective function to be solved into a general form of a linear system of equations: AX=b, A denoting a coefficient matrix, b denoting a column vector, X denoting an unknown vector to be solved;

A4, in the case of m(m−1)<=N, selecting to construct a single-layer neural network algorithm to solve the unknown vector to be solved; and A5, in the case of m(m−1)>N, selecting a principal component analysis algorithm to solve the unknown vector to be solved.

The selecting to construct a single-layer neural network algorithm to solve the unknown vector to be solved includes:
setting a function $f(X_1)=AX_1-b$, and outputting $f(X_1^k)=AX_1^k-b$, k=1, 2, . . . , n and denoting the number of sample training iterations, an error being $\delta^k=0-f(X_1^k)=-f(X_1^k)$, a performance index being $$T = \frac{1}{2}\|\delta^k\|_2^2, \|\delta^k\|_2^2$$

denoting the square of a 2-norm of $\|\delta^k\|$, $X_1$ denoting a weight of a neural network training, $X_1^k$ denoting a weight of a kth neural network training;

calculating a weight adjustment amount $$\Delta X_1^k = -\eta \frac{dT}{dX_1^k} = \eta A^T \delta^k,$$

$\eta$ denoting a learning rate, $0<\eta<1$, $A^T$ denoting a transposed matrix of A; and calculating a single-layer neural network to iterate a rooting formula $$X_1^{k+1}=X_1^k+\Delta X_1^k=X_1^k+\eta A^T\delta^k.$$

The selecting a principal component analysis algorithm to solve the unknown vector to be solved includes:

performing singular value decomposition on A to obtain $A=U\Lambda V^T=CV^T$, V denoting a matrix formed by $A^T$ eigenvectors, C denoting a principal component matrix, $\Lambda$ denoting a diagonal matrix with a principal diagonal including singular values of A, having a consistent dimension as A and being also an eigenvalue of $A^TA$, column vectors of U being standard orthogonal eigenvectors of $A^HA$, $A^H$ denoting transpose conjugates;

setting $Y=V^TX_2$, converting the equation $AX_2=b$ into solving $CY=b$, and selecting first p column vectors of C and Y as principal components, denoted as $C_1$ and $Y_1$ respectively, where the idea of principal component analysis is that only first p columns are selected as the principal components and the components other than the first p columns are not considered, p is selected by observing the cumulative percentage of eigenvalues, $C=(C_1, C_2)$, $V=(V_1, V_2)$, $C_1$ and $V_1$ are formed by the first p column vectors of C and V, $C_2$ and $V_2$ being formed by residual column vectors except the principal components, and $C_1Y_1=b$ is solved to obtain $Y_1\sim C_1^+ b=\Lambda_1^+C_1^Tb$ such that $X_2\sim(V_1^T)+Y_1$, "+" denoting generalized inverse and being equivalent to an inverse matrix when a matrix is nonsingular, "$\sim$" denoting to take a least squares approximate solution, rather than an absolute true solution; and calculating a rooting formula $\tilde{X}_2=V_1Y_1$ that uses principal component analysis, a calculation error being $\|A\tilde{X}_2-b\|_2$, $\tilde{X}_2$ denoting an estimated value of $X_2$, namely, a least squares solution.

The capturing scattered field signals with sensor probes includes:

B1, acquiring the group of incident field signals through the sensor probes, performing fast Fourier transform on the group of signals to extract a value corresponding to a center frequency, and obtaining a ratio of the value to a theoretical Green's function, so as to obtain a group of calibration factors $$Q = \frac{U^{(in,exp)}}{G^{(in)}},$$

$U^{(in,exp)}$ denoting a frequency domain value of an experimental signal, $G^{(in)}$ denoting a calculation result of the theoretical Green's function;

B2, performing fast Fourier transform processing on all incident field signals received by the sensor probes in batches, extracting values corresponding to the center frequency to obtain $m(m-1)$ groups of frequency-domain total field signals, and obtaining ratios of all the signals to the calibration factor Q for calibration;

B3, calculating Green's functions corresponding to paths of the $m(m-1)$ groups of signals respectively based on a theoretical solution of a two-dimensional Green's function; and B4, subtracting the Green's functions obtained by calculation in step B3 from the total field signals calibrated in step B2, so as to obtain the final scattered field signals.

The modifying the Green's functions by variable born approximation for continuous iterations to approximate a true solution includes:

$C_1$, based on born approximation, namely total field signals being equal to incident field signals, obtaining an initial solution $O_0(r_n)$ of the objective function based on $U^{(s)}=DOU^{(t)}$, $r_n$ denoting a grid point position;

$C_2$, substituting $O_k(r_n)$ into $U^{(t)}=U^{(in)}+COU^{(t)}$ to obtain a total field $U_k^{(t)}$ denoting the number of iterations;

$C_3$, modifying the Green's functions based on a latest unknown function $O_k(r_n)$ recalculating a Green's function matrix $D_k=D(I-O_kC)^{-1}$, calculating a difference between the scattered field and the measured scattered field: $\Delta U_k^{(s)}=U_k^{(s)}-U^{(s)}$, stopping iterations in the case of reaching a given accuracy value, otherwise performing step $C_4$; and $C_4$, solving the equation $\Delta U_k^{(s)}=D_k\Delta O_kU_k^{(t)}$ with latest $U_k^{(t)}$ and $D_k$ obtained in step $C_2$ and step $C_3$, so as to obtain an increment $\Delta O_k$ of the unknown function, allowing $O_{k+1}=O_k+\Delta O_k$, and returning to step $C_2$.

Upon solving the final objective function $O_k$ to be solved, the objective function needs to be further processed to facilitate imaging and quantitative evaluation, specifically including: based on an analytical expression form $$O(r_n) = k_0^2\left[\left(\frac{c_0}{c(r_n)}\right)^2 - 1\right]$$

of the objective function, performing correspondence on the objective function $O_k(r_n)$ to a phase velocity $c(r_n)$, obtaining actual aluminum plate thickness distribution by combining a lamb wave dispersion curve, and performing imaging and quantitative evaluation based on a thickness value of each grid point, $k_0$ denoting the wave number of A0 mode lamb waves of the zero-defect aluminum plate at a selected center frequency, $c_0$ denoting the phase velocity of the zero-defect aluminum plate, $c(r_n)$ denoting a phase velocity of a grid point $r_n$ in a tested region.

The present disclosure has the following advantages:

1. The nonlinear lippmann-Schwinger equation is converted into the form of linear matrix summation, and the solution method is variable born approximation iterations, which can continuously correct the Green's functions to approximate the true solution. The method can be quickly implemented by programming.

2. By adjusting the arrays, the number of the probes can be selected based on the testing accuracy. Since different arrays obtain different numbers of scattered fields, an equation is under-determined in the case of sparse arrays, the equation is over-determined in the case of dense arrays, and suitable algorithms are selected for solutions.

3. Different from a traditional non-destructive testing localization algorithm, the method has strict mathematical logics and rigorous derivation, can allow experimental verification and realize the quantitative evaluation of non-destructive testing, and can be widely used in practical guided wave testing applications of industrial non-destructive testing.

DETAILED DESCRIPTION OF EMBODIMENTS

Figure 1:
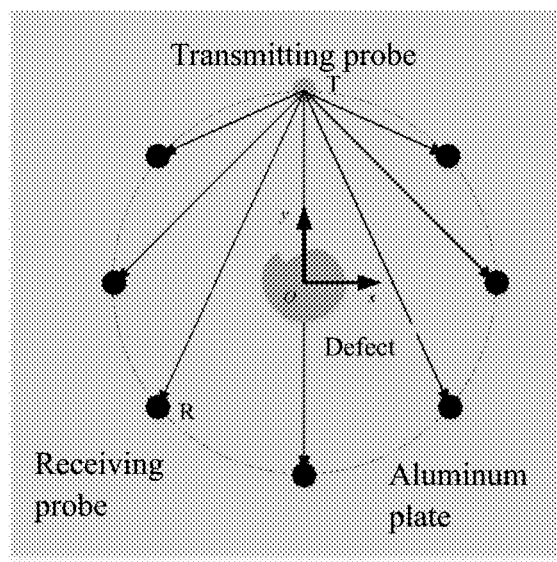
FIG. 1 is a schematic structural diagram of an array for obtaining acquired signals by adjusting the number of probes of the array and adopting a one-transmitting and multi-receiving form.

In order to make the objective, technical solutions and advantages of embodiments of the present application clearer, the technical solutions in the embodiments of the present application will be clearly and completely described below with reference to the accompanying drawings in the embodiments of the present application. Apparently, the embodiments described hereinafter are merely a part of the embodiments of the present application, rather than all the embodiments. Generally, the components of the embodiments of the present application, which are described and illustrated in the figures herein, may be arranged and designed in a variety of different configurations. Accordingly, the following detailed description of the embodiments of the present application provided in conjunction with the accompanying drawings is not intended to limit the protection scope of the present application as claimed, but is merely representative of selected embodiments of the present application. Based on the embodiments of the present application, all other embodiments obtained by a person skilled in the art without involving any inventive effort fall within the protection scope of the present application. The present disclosure is further illustrated below in conjunction with the accompanying drawings.

The present disclosure relates to a method for ultrasonic guided wave quantitative imaging in a form of variable array. The method includes: Set up an ultrasonic guided wave non-destructive testing platform, and design a circular sensor array including different numbers of probes. Acquire guided wave scattered field signals through the array with one probe for excitation and the other probes for receiving by changing an excitation position to repeat operations. Invert the acquired scattered field signals through a lippmann-Schwinger equation in the form of linear summation, an inversion algorithm being a variable born approximation iteration algorithm. The inversion algorithm corresponds to different solution methods in different arrays: the inversion algorithm corresponds to a neural network algorithm when in an under-determined form, and corresponds to a principal component analysis algorithm when in an over-determined form. Map an objective function obtained by a final result of the inversion algorithm to obtain a thickness value of each grid point in an imaging region, and perform imaging based on the thickness values. Therefore, the effect of quantitative evaluation is achieved.

Further, the ultrasonic guided wave non-destructive testing platform includes a PC, a signal generator, a power amplifier, a guided wave probe, an aluminum plate to be tested, a preamplifier, and an acquisition card. The PC is equipped with labview for modulation of an acquired signal, a digital signal is transferred to the signal generator for digital-to-electrical conversion, a voltage signal is amplified by the power amplifier and transferred to the guided wave probe to excite a trigger signal, the trigger signal is then received by acquisition probes, transferred to the preamplifier to be amplified once at a receiving end, and transmitted to the acquisition card, and the acquired signal is displayed and stored by the PC.

As shown in FIG. 1, a specific testing target is an aluminum plate with an unknown defect. The thickness of the aluminum plate is 3 mm, and the testing diameter is 40 cm. A certain number of transducers (sensor probes) are arranged on the testing circumference. A circular array in a one-transmitting and multi-receiving form is adopted, and probes of any number may be provided. A total of four arrays are provided in the design of the present disclosure, which are an 8-probe array, a 16-probe array, a 32-probe array, and a 64-probe array respectively. The four arrays may acquire 56 groups of signals, 240 groups of signals, 992 groups of signals, and 4032 groups of signals respectively. Based on array requirements, if m probes are provided, m(m−1) groups of acquired signals may be obtained.

Further, the acquisition probe in the array may be an air-coupled guided wave probe. Corresponding to the aluminum plate with the thickness of 3 mm, the excitation frequency is 200 k, an oblique incidence angle is 9.74 degrees through calculation based on the snell law, and an excitation mode is a lamb wave A0 mode.

Figure 2:
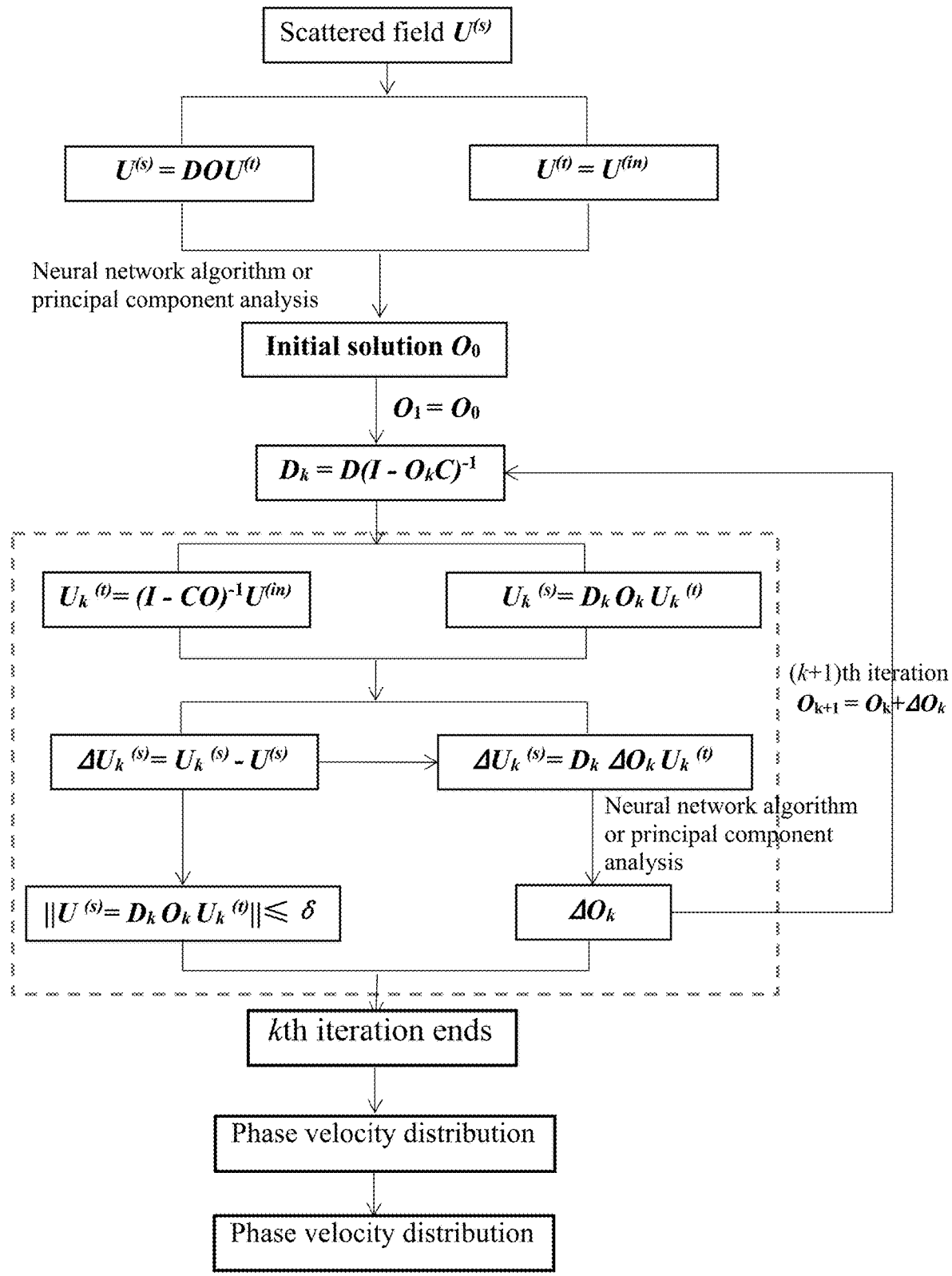
FIG. 2 is a schematic flow diagram of a method according to the present disclosure.

Further, as shown in FIG. 2, the acquired signals of the array need to be processed correspondingly so as to obtain scattered fields. A processing method includes the following steps:

A. First, acquire, by the sensor probes, a group of zero-defect incident field signals, that is, actual signals received by the sensor probes, perform Fast Fourier transform on the group of signals to extract a value corresponding to a center frequency, the value being a complex number, and obtain a ratio of the value to a theoretical Green's function, so as to obtain a group of calibration factors:

$$Q = \frac{U^{(in,exp)}}{G^{(in)}} \quad (1)$$

where $U^{(in,exp)}$ denotes a frequency domain value of an experimental signal, $G^{(in)}$ denotes a calculation result of the theoretical Green's function, and Q denotes the calibration factors.

B. Then, perform fast Fourier transform processing on all signals received by the sensor probes in batches, extract values corresponding to the center frequency to obtain m(m−1) groups of frequency-domain total field signals, and obtain ratios of all the signals to Q for calibration.

C. Calculate Green's functions corresponding to paths of the m(m−1) groups of signals respectively based on a theoretical solution of a two-dimensional Green's function.

D. Subtract the Green's functions obtained by calculation in step C from the total field signals calibrated in step B, so as to obtain the final scattered field signals.

Further, the core of the present disclosure lies in the linear lippmann-Schwinger equation in the form as:

$$U^{(t)} = U^{(in)} + COU^{(t)} \quad (2)$$
$$U^{(s)} = DOU^{(t)}$$

where $U^{(t)}$ denotes a total field, $U^{(in)}$ denotes an incident field, $U^{(s)}$ denotes a scattered field, C denotes a Green's function of a zero-defect aluminum plate, O denotes an objective function to be solved, D denoting a Green's function of the defective aluminum plate. In order to obtain sufficient imaging accuracy, the variable born approximation iteration solution algorithm is selected as the solution algorithm of the equation, and the Green's functions are modified constantly to obtain the real objective function. A solution method is selected for each iteration process based on the array form.

Further, the variable born approximation iteration algorithm is used for solving the objective function in the linear lippmann-Schwinger equation, and includes the following steps:

A. First, based on born approximation, namely the total field signals being equal to the incident field signals, obtain an initial solution $O_0(r_n)$ of the objective function based on $U^{(s)}=DOU^{(t)}$, $r_n$ being a grid point position.

B. Substitute $O_k(r_n)$ into $U^{(t)}=U^{(in)}+COU^{(t)}$ to obtain a total field $U_k^{(t)}$, k denoting the number of iterations.

C. Modify the Green's functions based on a latest unknown function $O_k(r_n)$ recalculate a Green's function matrix $D_k=D(I-O_kC)^{-1}$, calculate a difference between the scattered field and a measured scattered field: $\Delta U_k^{(s)}=U_k^{(s)}-U^{(s)}$, stop iterations in the case of reaching a given accuracy value δ, otherwise proceed to the next step.

D. Solve the equation $\Delta U_k^{(s)}=D_k\Delta O_kU_k^{(t)}$ with latest a $D_k$ obtained in step B and step C, so as to obtain an increment $\Delta O_k$ of the unknown function, allow $O_{k+1}=O_k+\Delta O_k$, and return to step B.

Further, the variable born approximation iteration algorithm is to constantly correct the Green's functions and cyclically iterate to solve the objective function. In each iteration, $\Delta U_k^{(s)}=D_k\Delta O_kU_k^{(t)}$ has a corresponding solution method, and all matrix equations to be solved may be written in the form of AX=b. The solution method is directly related to the number of probes. A region to be tested is divided into N grids, and m probes are provided, such that m(m−1) groups of scattered field signals may be obtained. In the case of m(m−1)<=N, a matrix equation is under-determined, and a single-layer neural network algorithm is constructed for a solution. In the case of m(m−1)>N, the matrix equation is over-determined, and the principal component analysis algorithm is selected for a solution.

Further, selecting to construct the single-layer neural network algorithm to solve an unknown vector to be solved includes:

Solve $AX_1=b$, set a function $f(X_1)=AX_1-b$, and output $f(X_1^k)=AX_1^k-b$, k=1, 2, . . . , n and denoting the number of sample training iterations, an error being $\delta^k=0-f(X_1^k)=-f(X_1^k)$, a performance index being $$T = \frac{1}{2}\|\delta^k\|_2^2, \|\delta^k\|_2^2$$

denoting the square of a 2-norm of $\|\delta^k\|$, $X_1$ denoting a weight of a neural network training, $X_1^k$ denoting a weight of a kth neural network training; calculate a weight adjustment amount $$\Delta X_1^k = -\eta\frac{dT}{dX_1^k} = \eta A^T\delta^k,$$

$A^T$ denoting a transposed matrix of A, η denoting a learning rate, 0<η<1.

Calculate a single-layer neural network to iterate a rooting formula $X_1^{k+1}=X_1^k+\Delta X_1^k=X_1^k+\eta A^T\delta^k$.

Further, selecting the principal component analysis algorithm to solve the unknown vector to be solved includes:
Solve $AX_2=b$, and perform singular value decomposition on A to obtain $A=U\Lambda V^T=CV^T$, V denoting a matrix formed by $A^T$ eigenvectors, C denoting a principal component matrix, Λ denoting a diagonal matrix with a principal diagonal including singular values of A, having a consistent dimension as A and being also an eigenvalue of $A^TA$, column vectors of U being standard orthogonal eigenvectors of $A^HA$, $*^T$ denoting transposition of a matrix *, $A^H$ denoting transpose conjugates.

Set $Y=V^TX_2$, convert the equation $AX_2=b$ into solving CY=b, and select first p column vectors of C and Y as principal components, denoted as $C_1$ and $Y_1$ respectively. The idea of principal component analysis is that only the first p columns are selected as the principal components, and the components other than the first p columns are not considered, where p is selected by observing the cumulative percentage of eigenvalues. $C=(C_1, C_2)$, and $V=(V_1, V_2)$. $C_1$ and $V_1$ are formed by the first p column vectors of C and V. $C_2$ and $V_2$ are formed by residual column vectors except the principal components. $C_1Y_1=b$ is solved to obtain $Y_1 \sim C_1^+ b=\Lambda_1C_1^Tb$, such that $X_2 \sim (V_1^T)+Y_1$, "+" denoting generalized inverse and being equivalent to an inverse matrix when a matrix is nonsingular, "~" denoting to take a least squares approximate solution, rather than an absolute true solution.

Calculate $\tilde{X}_2=V_1Y_1$, a calculation error being $\|A\tilde{X}_2-b\|_2$, $\tilde{X}_2$ denoting an estimated value of $X_2$, namely, a least squares solution, and $\tilde{X}_2=V_1Y_1$ being the rooting formula that uses principal component analysis.

Further, upon solving the final objective function $O_k$, the objective function needs to be further processed to facilitate imaging and quantitative evaluation. An analytical expression form of the objective function is $$O(r_n) = k_0^2\left[\left(\frac{c_0}{c(r_n)}\right)^2 - 1\right],$$

$k_0$ denoting the wave number of A0 mode lamb waves of the zero-defect aluminum plate at a selected center frequency, $c_0$ denoting the phase velocity of the zero-defect aluminum plate, $c(r_n)$ denoting a phase velocity of a grid point $r_n$ in the tested region. With the formula, the objective function $O_k(r_n)$ may correspond to the phase velocity $c(r_n)$, actual aluminum plate thickness distribution may be obtained by combining a lamb wave dispersion curve, and imaging and quantitative evaluation are performed based on a thickness value of each grid point.

For the embodiments of the 8-probe array, the 16-probe array, the 32-probe array, and the 64-probe array, the imaging region is divided into 1793 grids in total. The number of scattered field data obtained by the 8-probe array, the 16-probe array and the 32-probe array is less than the number of output data, such that the single-layer neural network solution algorithm is selected. The number of scattered field data obtained by the 64-probe array is greater than 1793, such that the principal component analysis algorithm is selected.

Figure 3:
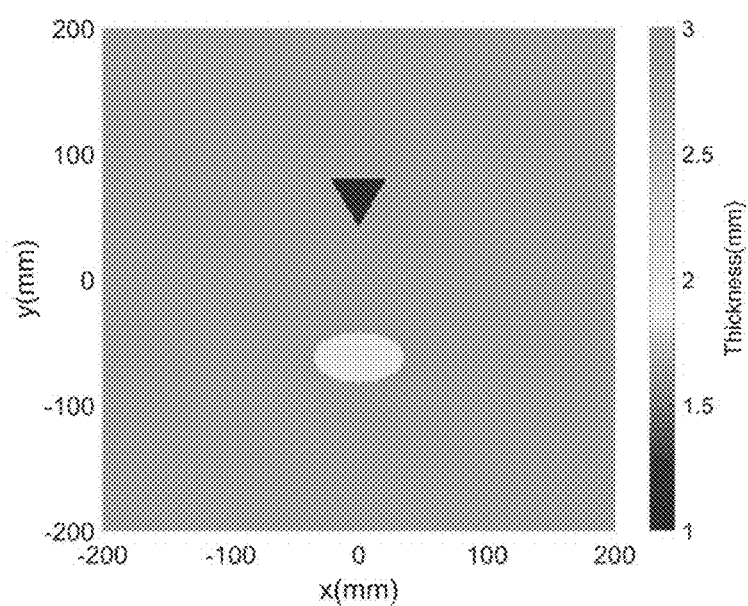
FIG. 3 is a diagram illustrating actual defects of a tested aluminum plate according to the present disclosure.
Figure 4:
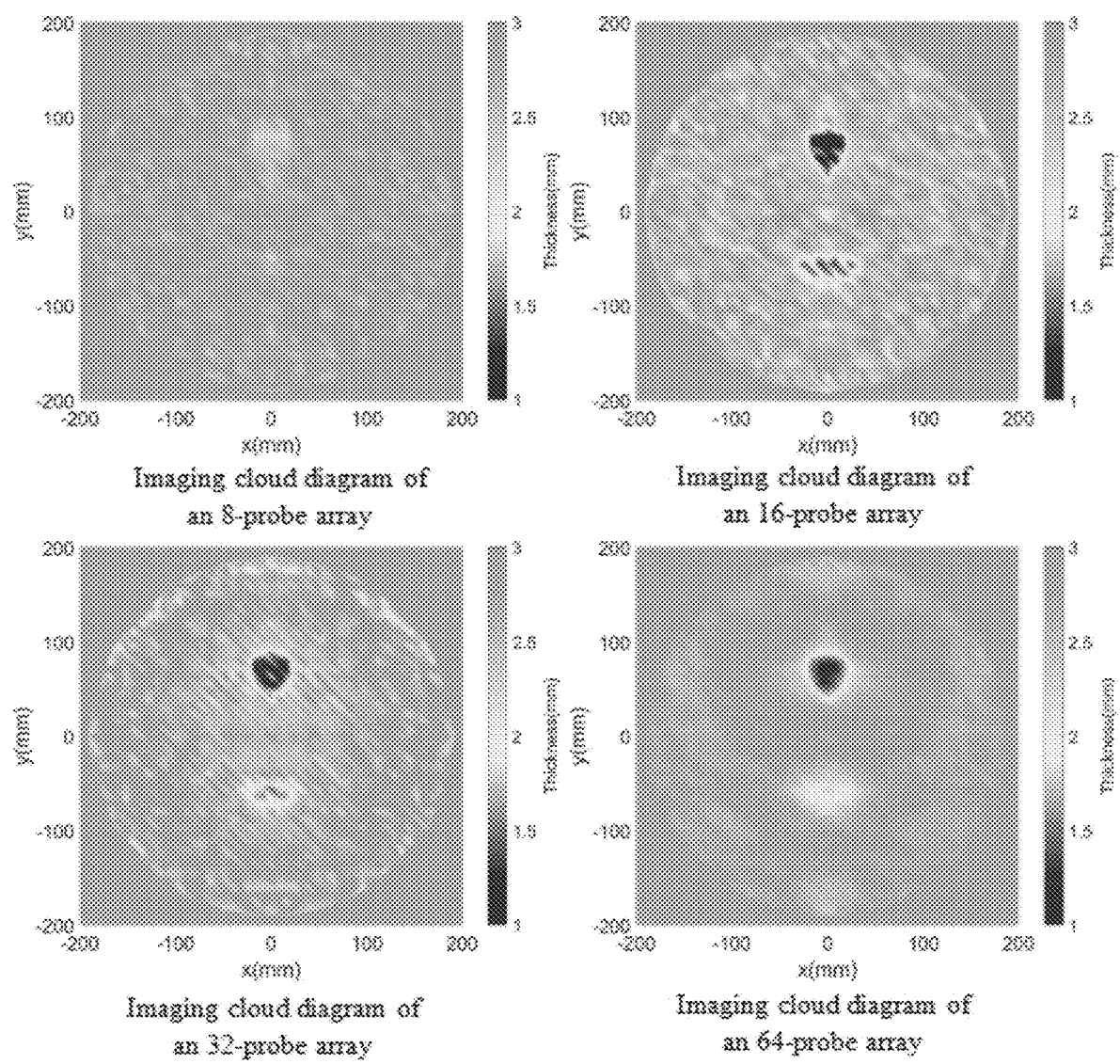
FIG. 4 are experimental imaging effect diagrams of an 8-probe array, a 16-probe array, a 32-probe array, and a 64-probe array according to the present disclosure.

FIG. 3 illustrates actual defects of the aluminum plate tested by the four embodiments, including a triangular defect and an elliptical defect. The residual thickness of the triangular defect is 1 mm, and the residual thickness of the elliptical defect is 2 mm. By performing imaging based on the method according to the present disclosure, imaging effect diagrams as shown in FIG. 4 are finally obtained, and the physical indicator of the cloud diagrams is thickness. The more probes in an array, the more accurate the imaging. Although there are many artifacts around the imaging cloud diagram of the 8-probe array, the effect of defect localization and recognition is also achieved. The shape reconstruction of the 16-probe array, the 32-probe array and the 64-probe array also reaches certain accuracy.

Figure 5:
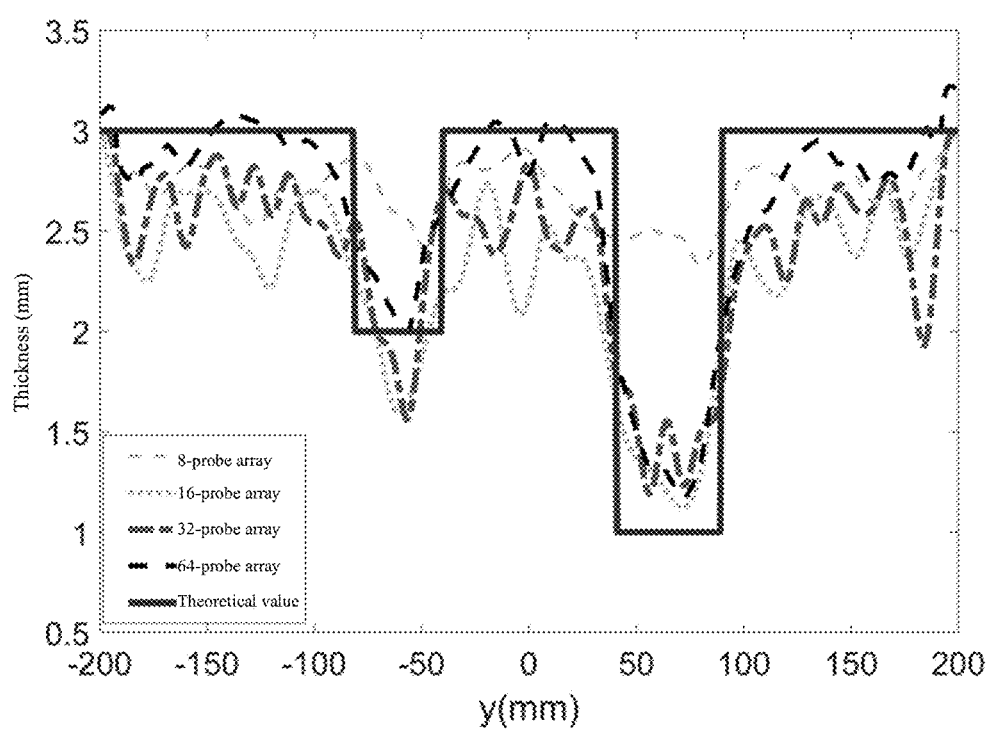
FIG. 5 is a graph of a defect trend quantitatively evaluated by intercepting a line segment passing a center according to a method of the present disclosure.

A line segment passing the center of the defect was intercepted, and thickness distribution thereof was observed, as shown in FIG. 5. The acquired data of the 8-probe array was too little to achieve quantitative evaluation. The thickness reconstruction of the 16-probe array, the 32-probe array and the 64-probe array achieved a desirable effect. Therefore, the purpose of quantitative evaluation may be achieved by applying the method to the field of industrial non-destructive testing.

While the foregoing is directed to the preferred embodiments of the present disclosure, it is to be understood that the present disclosure is not limited to the forms disclosed herein or construed as excluding other embodiments, but may be used in various other combinations, modifications, and environments.

Modifications may be made within the concepts described herein, through the above teachings or through the skill or knowledge of the relevant art. The alterations and changes made by a person skilled in the art without departing from the spirit and scope of the present disclosure shall fall within the protection scope of the appended claims of the present disclosure.

The invention claimed is:

1. A method for ultrasonic guided wave quantitative imaging in a form of variable array, comprising:
converting a non-linear integral result of a lippmann-Schwinger equation into a form of linear summation $$U^{(t)} = U^{(in)} + COU^{(t)}$$
$$U^{(s)} = DOU^{(t)}$$

by a method of moments, $U^{(t)}$ denoting a total field, $U^{(in)}$ denoting an incident field, $U^{(s)}$ denoting a scattered field, C denoting a Green's function of a zero-defect aluminum plate, O denoting an objective function to be solved, D denoting a Green's function of a defective aluminum plate;
selecting, based on data of a measured scattered field, acquisition arrays with different numbers of probes as an initial input, selecting different solution algorithms for the acquisition arrays with different numbers of probes, and modifying the Green's functions by variable born approximation for continuous iterations to approximate a true solution, so as to obtain a final objective function $O_k$ to be solved; and
converting, through a dispersion curve, the final objective function $O_k$ to be solved into a form of thickness d, wherein d=f($O_k$), and performing imaging in terms of a thickness of each point on a plate, pixels of each point representing the thickness of the point on the plate.

2. The method for ultrasonic guided wave quantitative imaging in a form of variable array according to claim 1, wherein the selecting, based on data of a measured scattered field, acquisition arrays with different numbers of probes as an initial input, and selecting different solution algorithms for the acquisition arrays with different numbers of probes comprises:
A1, dividing a region to be tested into N grids, and arranging m sensor probes on a circumferential boundary;

A2, capturing actual scattered field signals with any one of the sensor probes as excitation and all residual sensor probes as receiving points, so as to obtain a group of scattered field signals;
A3, selecting different sensor probes as excitation, repeating step A2 to obtain m(m−1) groups of scattered field signals, and converting, through the scattered field, the objective function to be solved into a general form of a linear system of equations: AX=b, A denoting a coefficient matrix, b denoting a column vector, X denoting an unknown vector to be solved;
A4, in the case of m(m−1)<=N, selecting to construct a single-layer neural network algorithm to solve the unknown vector to be solved; and
A5, in the case of m(m−1)>N, selecting a principal component analysis algorithm to solve the unknown vector to be solved.

3. The method for ultrasonic guided wave quantitative imaging in a form of variable array according to claim 2, wherein the selecting to construct a single-layer neural network algorithm to solve the unknown vector to be solved comprises:
setting a function $f(X_1)=AX_1-b$, and outputting $f(X_1^k)=AX_1^k-b$, k=1, 2, ..., n and denoting the number of sample training iterations, an error being $\delta^k=0-f(X_1^k)=-f(X_1^k)$, a performance index being $$T = \frac{1}{2}\|\delta^k\|_2^2, \|\delta^k\|_2^2$$

denoting the square of a 2-norm of $\|\delta^k\|$, $X_1$ denoting a weight of a neural network training, $X_1^k$ denoting a weight of a kth neural network training;
calculating a weight adjustment amount $$\Delta X_1^k = -\eta\frac{dT}{dX_1^k} = \eta A^T\delta^k,$$

η denoting a learning rate, 0<η<1, $A^T$ denoting a transposed matrix of A; and
calculating a single-layer neural network to iterate a rooting formula $X_1^{k+1}=X_1^k+\Delta X_1^k=X_1^k+\eta A^T\delta^k$.

4. The method for ultrasonic guided wave quantitative imaging in a form of variable array according to claim 2, wherein the selecting a principal component analysis algorithm to solve the unknown vector to be solved comprises:
performing singular value decomposition on A to obtain $A=U\Lambda V^T=CV^T$, V denoting a matrix formed by $A^T$ eigenvectors, C denoting a principal component matrix, Λ denoting a diagonal matrix with a principal diagonal comprising singular values of A, having a consistent dimension as A and being also an eigenvalue of $A^TA$, column vectors of U being standard orthogonal eigenvectors of $A^HA$, $A^H$ denoting transpose conjugates;
setting $Y=V^TX_2$, converting the equation $AX_2=b$ into solving CY=b, and selecting first p column vectors of C and Y as principal components, denoted as $C_1$ and $Y_1$ respectively, wherein $C=(C_1, C_2)$, $V=(V_1, V_2)$, $C_1$ and $V_1$ are formed by the first p column vectors of C and V, $C_2$ and $V_2$ are formed by residual column vectors except the principal components, $C_1Y_1=b$ is solved to obtain $Y_1\sim C_1^+b=\Lambda_1^+C_1^T b$, such that $X_2\sim(V_1)+Y_1$, "+" denoting generalized inverse and being equivalent to an inverse matrix when a matrix is nonsingular, "~" denoting to take a least squares approximate solution, rather than an absolute true solution; and calculating a rooting formula $\tilde{X}_2 = V_1 Y_1$ that uses principal component analysis, a calculation error being $\|A\tilde{X}_2 - b\|_2$, $\tilde{X}_2$ denoting an estimated value of $X_2$ namely, a least squares solution.

5. The method for ultrasonic guided wave quantitative imaging in a form of variable array according to claim 2, wherein the capturing scattered field signals with sensor probes comprises:

B1, acquiring the group of incident field signals through the sensor probes, performing fast Fourier transform on the group of signals to extract a value corresponding to a center frequency, and obtaining a ratio of the value to a theoretical Green's function, so as to obtain a group of calibration factors $$Q = \frac{U^{(in,exp)}}{G^{(in)}},$$

$U^{(in,exp)}$ denoting a frequency domain value of an experimental signal, $G^{(in)}$ denoting a calculation result of the theoretical Green's function;

B2, performing fast Fourier transform processing on all incident field signals received by the sensor probes in batches, extracting values corresponding to the center frequency to obtain m(m−1) groups of frequency-domain total field signals, and obtaining ratios of all the signals to the calibration factor Q for calibration;

B3, calculating Green's functions corresponding to paths of the m(m−1) groups of signals respectively based on a theoretical solution of a two-dimensional Green's function; and B4, subtracting the Green's functions obtained by calculation in step B3 from the total field signals calibrated in step B2, so as to obtain the final scattered field signals.

6. The method for ultrasonic guided wave quantitative imaging in a form of variable array according to claim 1, wherein the modifying the Green's functions by variable born approximation for continuous iterations to approximate a true solution comprises:

$C_1$, based on born approximation, namely total field signals being equal to incident field signals, obtaining an initial solution $O_0(r_n)$ of the objective function based on $U^{(s)} = DOU^{(t)}$, $r_n$ denoting a grid point position;

$C_2$, substituting $O_k(r_n)$ into $U^{(t)} = U^{(in)} + COU^{(t)}$ to obtain a total field $U_k^{(t)}$, k denoting the number of iterations;

$C_3$, modifying the Green's functions based on a latest unknown function $O_k(r_n)$, recalculating a Green's function matrix $D_k = D(I - O_k C)^{-1}$, calculating a difference between the scattered field and the measured scattered field: $\Delta U_k^{(2)} = U_k^{(s)} - U^{(s)}$, stopping iterations in the case of reaching a given accuracy value, otherwise performing step $C_4$; and $C_4$, solving the equation $\Delta U_k^{(s)} = D_k \Delta O_k U_k^{(t)}$ with latest $U_k^{(t)}$ and $D_k$ obtained in step $C_2$ and step $C_3$, so as to obtain an increment $\Delta O_k$ of the unknown function, allowing $O_{k+1} = O_k + \Delta O_k$, and returning to step $C_2$.

7. The method for ultrasonic guided wave quantitative imaging in a form of variable array according to claim 1, wherein upon solving the final objective function $O_k$ to be solved, the objective function needs to be further processed to facilitate imaging and quantitative evaluation, specifically comprising: based on an analytical expression form $$O(r_n) = k_0^2 \left[ \left( \frac{c_0}{c(r_n)} \right)^2 - 1 \right]$$

of the objective function, performing correspondence on the objective function $O_k(r_n)$ to a phase velocity $c(r_n)$ obtaining actual aluminum plate thickness distribution by combining a lamb wave dispersion curve, and performing imaging and quantitative evaluation based on a thickness value of each grid point, $k_0$ denoting the wave number of A0 mode lamb waves of the zero-defect aluminum plate at a selected center frequency, $c_0$ denoting the phase velocity of the zero-defect aluminum plate, $c(r_n)$ denoting a phase velocity of a grid point $r_n$ in a tested region.

* * * * *